United States Patent [19]
Fujita

[11] Patent Number: 5,605,638
[45] Date of Patent: Feb. 25, 1997

[54] ELECTRIC DISCHARGE MACHINING (EDM) APPARATUS

[75] Inventor: Ichiro Fujita, Fukui, Japan

[73] Assignee: Sodick Co., Ltd., Yokohama, Japan

[21] Appl. No.: 374,775

[22] PCT Filed: Jun. 16, 1994

[86] PCT No.: PCT/JP94/00979

§ 371 Date: Feb. 8, 1995

§ 102(e) Date: Feb. 8, 1995

[87] PCT Pub. No.: WO94/29059

PCT Pub. Date: Dec. 22, 1994

[30] Foreign Application Priority Data

Jun. 16, 1993 [JP] Japan .................................. 5-181825

[51] Int. Cl.⁶ .................... B23H 1/00; B23H 1/10
[52] U.S. Cl. ...................... 219/69.14; 219/69.12
[58] Field of Search ................. 219/69.14, 69.12

[56] References Cited

U.S. PATENT DOCUMENTS 4,392,042  7/1983  Inoue .......................... 219/69.12
4,857,688  8/1989  Aso et al. ..................... 219/69.14
5,013,432  5/1991  Martinez-Mugica ............ 219/69.14
5,126,524  6/1992  Moro et al. .................... 219/69.12

FOREIGN PATENT DOCUMENTS

56-119327  9/1981  Japan .
63-196323  8/1988  Japan .
4-159023   6/1992  Japan .
5-13767    2/1993  Japan .
6-206121   7/1994  Japan ...................... 219/69.14

*Primary Examiner*—Geoffrey S. Evans
*Attorney, Agent, or Firm*—Herbert Dubno; Yuri Kateshov

[57] ABSTRACT

The EDM apparatus for machining a workpiece by electric discharge while supplying dielectric fluid which contains powder to the work gap formed by a tool electrode and the workpiece to be machined includes a cover to protect them against the adherence of the powder that is contained in the dielectric fluid, a fluid feeding device supplying the powder-containing fluid to the work gap during the electric discharge machine process, and, at the same time, also supplying fluid that does not contain any powder to the parts inside the cover.

3 Claims, 7 Drawing Sheets

FIG 7

ELECTRIC DISCHARGE MACHINING (EDM) APPARATUS

CROSS REFERENCE TO RELATED APPLICATIONS

This is a National Phase Application of PCT/JP94/00979 filed 16 Jun. 1994 and based, in turn, on Japanese National Application 5-181825 filed 16 Jun. 1993 under the International Convention.

FIELD OF THE INVENTION

The invention relates to an EDM apparatus, i.e. a machine which uses a dielectric fluid containing powder or a dielectric fluid containing no powder as the machining medium.

BACKGROUND OF THE INVENTION

Generally, EDM apparatus can be divided into two types, die-sinking EDM machines and wire-cut EDM machines. A die-sinking EDM machine uses a 3-dimensional tool electrode with a dielectric fluid, such as, for example, an aqueous solution containing kerosene or a high molecular weight compound, in the gap between the electrode and the workpiece, as the machining medium. It machines the workpiece by applying voltage to that gap and generating an electrical discharge across the gap.

On the other hand, a wire-cut EDM machine uses wire made from such material as brass or tungsten of a diameter of 0.02 to 0.03 mm as the tool electrode. It machines the workpiece by running the wire in juxtaposition with the workpiece between a pair of wire guides. It generally uses deionized water or a kerosene based fluid as the dielectric fluid that is present between the wire and the workpiece.

In finish-machining, it is known that using a dielectric fluid with, for example, finely powdered polycrystalline silicon, mixed in it, will provide a good surface roughness on the workpiece and will improve machining stability. British Patent No. 828,336 and U.S. Pat. Nos. 4,392,042 and 4,952,768 disclose the use of this sort of fluid.

If this fluid is used in a wire-cut EDM machine, it could affect the travel of the wire by, for example, powder entering the rotating parts in the work tank, such as the bearings in the rollers provided along the wire conveying route, and, as a result, causing an undesirable effect on the machining. Furthermore, if the powder enters the movable wire guides or into the wire guide assemblies containing the movable electricity feeding elements which supply electricity to the wire, it could hinder the movements of those guides and elements. Also, much labor is required to remove the powder that remains in the wire conveying mechanism and guide assemblies when the machining work is finished.

OBJECTS OF THE INVENTION one of the objects of the present invention is to provide an EDM apparatus in which powder-containing fluid does not adhere to the necessary parts in the work tank.

Another object of the present invention is to provide an EDM apparatus in which the work of removing the powder-containing fluid adhering to the necessary parts in the work tank is reduced.

SUMMARY OF THE INVENTION

In order to achieve the foregoing objects, the EDM apparatus of the present invention, is an apparatus which uses tool electrodes located in the work tank and machines the workpiece by electrical discharge. It has a housing that accommodates such sliding parts as the electricity feeding element and wire guides for the wire electrode, and has a fluid feeding device that, while supplying powder-containing dielectric fluid to the working gap formed by the wire electrode and the workpiece, introduces powder-free fluid into that housing.

Also, desirably, the EDM apparatus should contain a cover which houses the movable parts located along the wire conveying route, and the fluid feeding device should, during the EDM process using powder-containing fluid, introduce powder-free fluid into that cover.

BRIEF DESCRIPTION OF THE DRAWINGS

The above and other objects, advantages and new features of the present invention will become more readily apparent from the following description, references are being made to the accompanying drawing in which.

SPECIFIC DESCRIPTION

Figure 1:
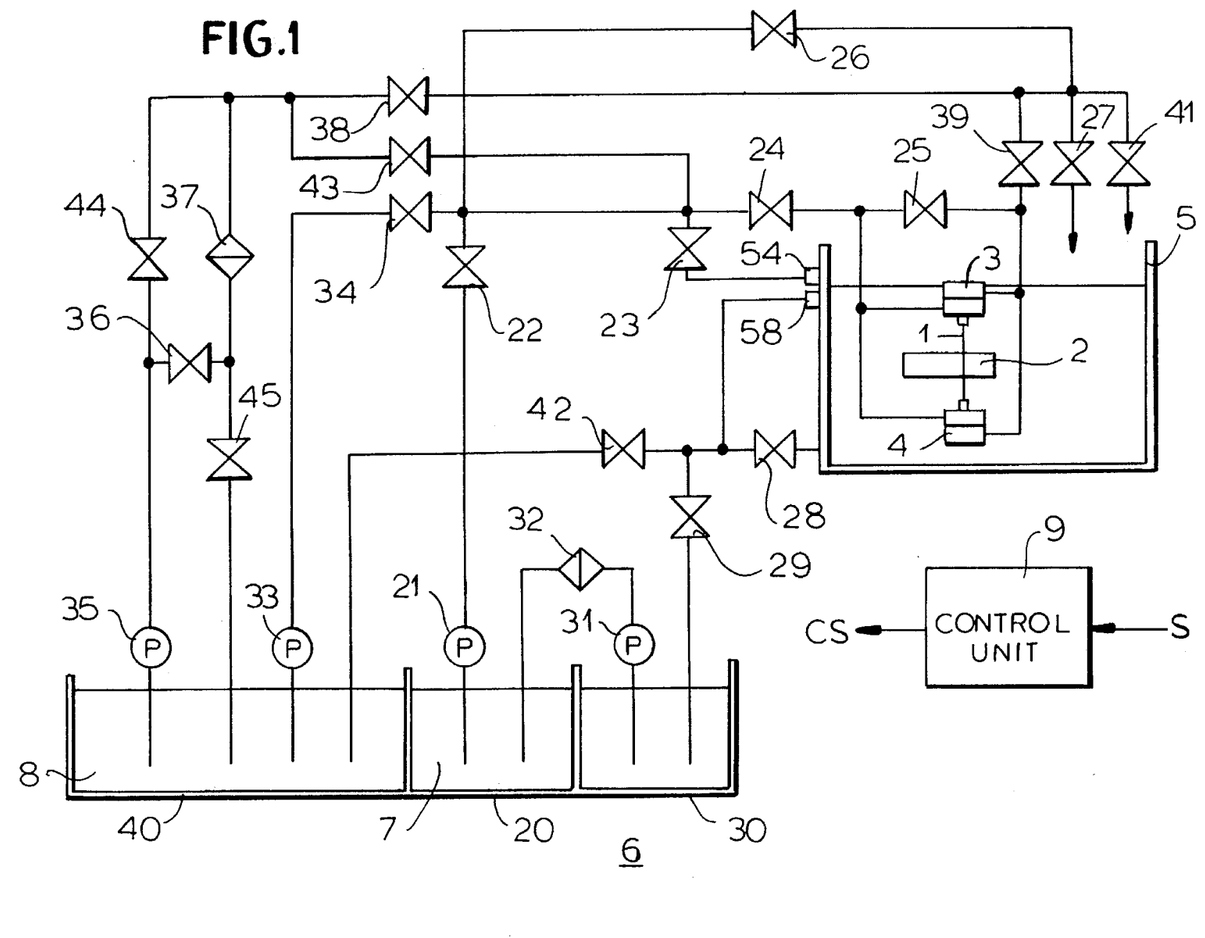
FIG. 1 is a schematic drawing illustrating an embodiment of the EDM apparatus of the present invention.

FIG. 1 shows an embodiment of a wire-cut EDM apparatus. In that apparatus, the wire electrode 1 is continuously fed from a wire feeding (not shown in the drawing), and is guided by a pair of wire guides, described later, to the gap formed by wire 1 and the workpiece 2 located in the work tank 5. In the embodiment illustrated, the pair of wire guides is located respectively above and below the workpiece 2 and is part of the guide assemblies 3 and 4. During the EDM process, voltage pulses are supplied to the gap intermittently by a power supply device (not shown in the drawing), to generate electric discharges and machine the workpiece 2.

In the embodiment illustrated, a dielectric fluid feeding device 6 is provided which selectively feeds to the work gap oil-based dielectric liquid 7 containing no powder and oil-based dielectric liquid 8 containing powder. The fluid feeding device 6 consists of tank 20 for holding fluid 7 containing no powder, tank 30 for holding used fluid 7 discharged from work tank 5, and tank 40 for holding fluid 8 containing powder. Desirably, the dielectric fluid 7 (free from powder) should be used for roughing and the fluid 8 (with the powder) for finishing.

The feed route of inductive fluid 7 is explained herewith by referring to FIG. 1. By operating pump 21 when preparing to machine, fluid 7 in tank 20 is fed, via solenoid valves 22 and 23, from feed inlet 5A into tank 5 and fills work tank 5 with fluid 7. During the machining process, by operating pump 21, the fluid 7 in tank 20 is injected from the respective nozzles of guide assemblies 3 and 4, via solenoid valves 22 and 24, into the work gap. In a wire-cut EDM machine, desirably, an automatic wire threading device should be provided so that, at the start of machining or when the wire breaks, wire 1 is automatically threaded through the work gap of workpiece 2 and strung between the pair of wire guides. For example, in Japanese Official Unexamined Patent Publication No. 62-13029, an automatic wire threading device is disclosed whereby the wire is threaded between the work gap and the lower wire guide by introducing the wire into a pipe that can be raised or lowered and using the jet flow created by feeding pressurized fluid into the pipe, to thread the wire. IN the present embodiment, by operating pump 21, fluid 7 in tank 20 is fed, via solenoid valves 22 and 27, to the automatic wire threading device to provide the necessary jet flow. In work tank 5, an overflow outlet 5B is provided to discharge overflow fluid and maintain the fluid of work tank 5 at a fixed level. The discharged overflow fluid is sent, via solenoid valve 29, to tank 30. When machining is finished, dielectric fluid 7 in work tank 5 is sent, via solenoid valves 28 and 29, to tank 30. By running pump 31, fluid 7 in tank 30 is returned to tank 20 via filter 32 which removes the chips that are produced during the electric discharge machining.

Next, the feed route of dielectric liquid 8 (with the powder) is explained herewith. By operating pump 33 when preparing to machine, dielectric fluid 8 in tank 40 is fed, via solenoid valves 34 and 23, from feed inlet 5A into work tank 5 and fills work tank 5 the dielectric liquid. During the machining process, by closing valve 25 and operating pump 33, the dielectric liquid 8 in tank 30 is injected from the respective nozzles of guide assemblies 3 and 4, via solenoid valves 34 and 24, into the work gap.

In addition, fluid not containing powder 1 is fed into the guide assemblies so that powder does not enter the part housing the movable parts such as, for example, the wire guides and electricity feeding element. The fluid 7 may be used to prevent the ingress of powder. Desirably, fluid made free of powder by filtering fluid 8 should be used. In the embodiment illustrated, backwashing filter 37 is provided in order to remove the powder from fluid 8. By closing valve 25 and operating pump 35, the fluid 8 in tank 30 is fed to guide assemblies 3 and 4, via solenoid valve 36, backwashing filter 37, and solenoid valves 38 and 39. In addition, in order that powder does not enter the rotating parts provided in the work tank, fluid 8 is fed to the wire conveying route via backwashing filter 37 and solenoid valves 38 and 41. Also, it is desirable that during the automatic wire threading process, by operating pump 35, fluid 8 be fed to the automatic wire threading device via solenoid valve 36, backwashing filter 37 and solenoid valves 38 and 27. Overflow fluid is sent from overflow outlet 5B to tank 40 via solenoid valve 42. When machining is finished, fluid 8 in work tank 5 is sent, via solenoid valves 28 and 42, to tank 40.

As the dielectric fluid 8 with powder is used only for finishing, the quantity of chips produced by electric discharge machining is relatively small. In order to remove those chips, a filtering device such as a centrifugal filter or a magnet filter may be provided. In addition, a density controlling device, including a density detector, may be provided to control the concentration of the powder in the dielectric liquid 8. An agitator may also be furnished to prevent the settling of powder.

When the machining process is over, dielectric liquid 8 will remain at the bottom of work tank 8 and in guide assemblies 3 and 4, or will adhere to the work stand and jig that support workpiece 2. After the fluid has evaporated, the powder adheres firmly to the components in work 5 and is difficult to remove. When cleaning this work tank 5, it is desirable to wash off the powder-containing residual fluid by operating pump 35 and introducing fluid 8 into work tank 5 via solenoid valve 36, backwashing filter 37, solenoid valves 43 and 23 and feed inlet 5A. In addition, when necessary, fluid 8 may be fed, via solenoid valve 36, backwashing filter 37 and solenoid valves 38 and 39, to the respective nozzles of guide assemblies 3 and 4 to remove any powder remaining in those nozzles. Fluid 8 used fro the above cleaning process is discharged from work tank 5 and returned to tank 40 via solenoid valves 28 and 42.

In order to return to tank 40 the powder that was caught by backwashing filter 37, fluid 8 in tank 40 is circulated via solenoid valve 44, backwashing filter 37 and solenoid valve 45, by closing valves 36, 38 and 43, and operating pump 35 for a fixed period, to recover the powder that was caught on backwashing filter 37.

As described in the foregoing, in the present embodiment, by sending, not fluid 7, but fluid 8 to work tank 5 via the backwashing filter, ingress of powder into the movable and sliding parts is prevented or the powder remaining in work tank 5 after machining is done using fluid 8, is removed. Therefore, the concentration of powder in tank 40 is maintained at a uniform level after the powder that has been caught on backwashing filter 37 is recovered, and it is easy to exercise control over the density of the powder. Also, fluid 8 sent from tank 40 and the powder remaining in work tank 5 are always returned to tank 40, so there is no loss of precious powder.

Note that in the present embodiment of the wire-cut EDM machine, control unit 9 is furnished to control the solenoid valves and pumps shown in FIG. 1. This control unit responds, for example, to signal S which indicates the operating state of the machine proper, decides on the operating sequence of the solenoid valves and pumps employing a microcomputer, and outputs control signal CS. Or, control unit 9 may be made to output control signal CS by reading commands input manually by an operator or commands read out from a program.

Figure 2:
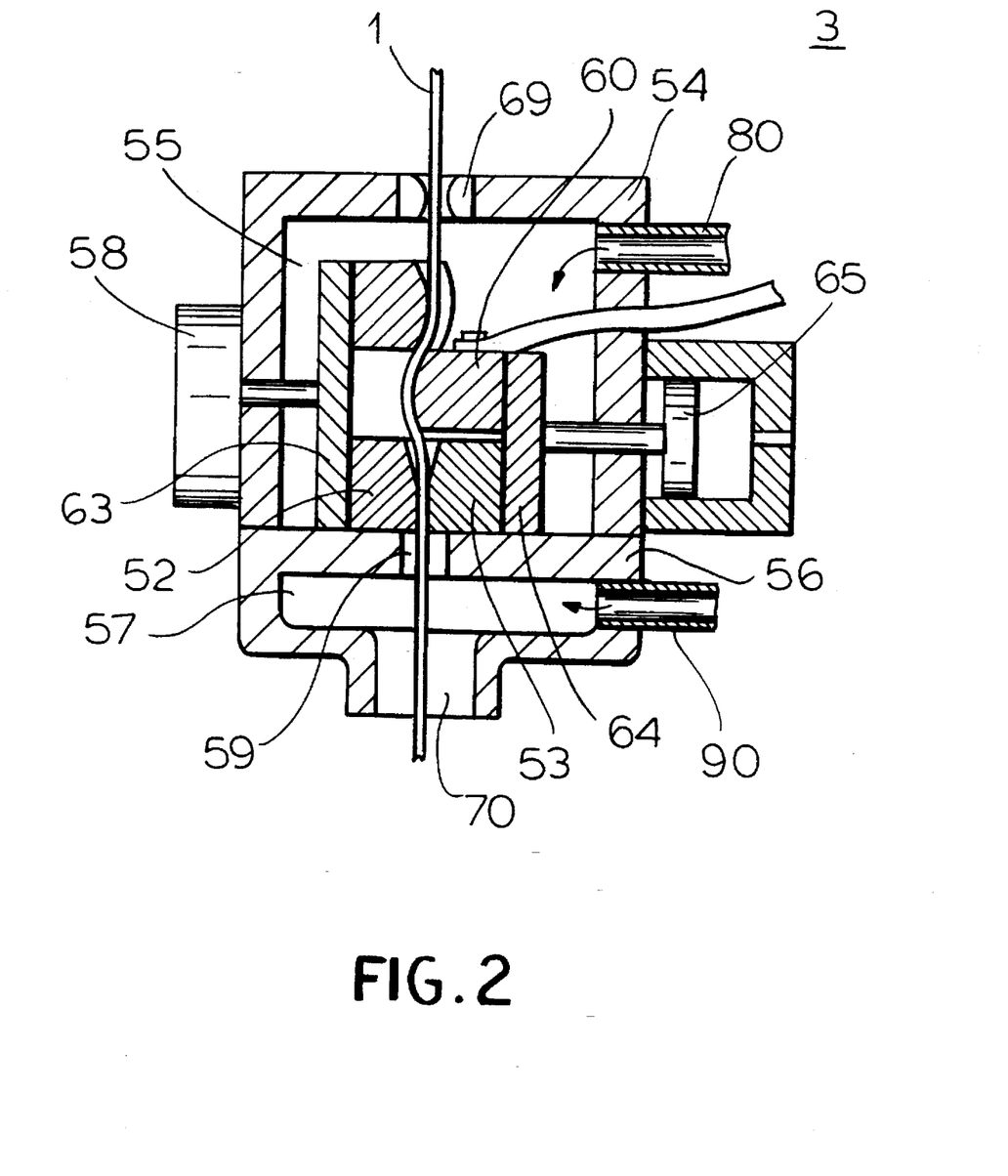
FIG. 2 is a sectional view of an embodiment of the upper guide assembly shown in FIG. 1.

Upper guide assembly 3 shown in FIG. 1 is explained herewith by referring to FIG. 2. Upper guide assembly 3 includes nozzle housing 56. This housing 56 forms not only chamber 57 but also includes nozzle 70 opposite workpiece 2. Also, there is a hole made in housing 56 in order to thread wire 1. This hole 59 is of a diameter that permits a pipe (not shown in the drawing) to pass through it in the automatic wire threading process. During the machining process, dielectric liquid is introduced from feed inlet 90 into chamber 57 and injected toward the work gap from nozzle 70.

Guide assembly 3, additionally includes guide housing 54 which is furnished on top of the nozzle housing. This guide housing 54 forms chamber 55. In this chamber 55 is housed electricity feeding element 60 which feeds electric current from the power supply to wire 1 through a suitable feeder line. This electricity feeding element is attached to a movable part 64 activated by actuator 65 so that the element can either press against or move away from wire 1. In addition, in chamber 55, relative to electricity feeding element 60, is housed wire guide 51 located on the top and wire guides 52 and 53 located on the bottom. These wire guides each have a V-shaped groove in them. Upper wire guide 51 is attached to a movable part 63 activated by actuator 58 so that it can either contact or move away from wire 1. Lower wire guides 52 and 53 are respectively attached to movable parts 63 and 64. During the machining process, guides 52 and 53 are made to come into contact by actuators 58 and 65 so that they form a guide hole, only slightly larger than the diameter of wire 1, leading to hole 59. This guide hole determines the position of wire 1 relative to workpiece 2. When wire is being automatically threaded, electricity feeding element 60 and guides 51, 52 and 53 are moved away from wire 1 by actuators 58 and 65.

So that powder-containing fluid does not enter chamber 55 from die guide 69 attached to guide housing 54 and then from hole 59, fluid not containing powder is introduced from feed inlet 80. This causes wire 1 to be accurately positioned by the smooth movement of movable parts 63 and 64 and the contacting of guide 52 and 53. Also, cleaning after machining is not necessary since powder-containing fluid will not remain in such a confined space as the V-shaped groove of the wire guides. Note that the pressure of the fluid that is introduced from feed inlet 80 should, desirably, be controlled to the same level as or slightly higher than the pressure of the fluid introduced from feed inlet 90.

Figure 3:
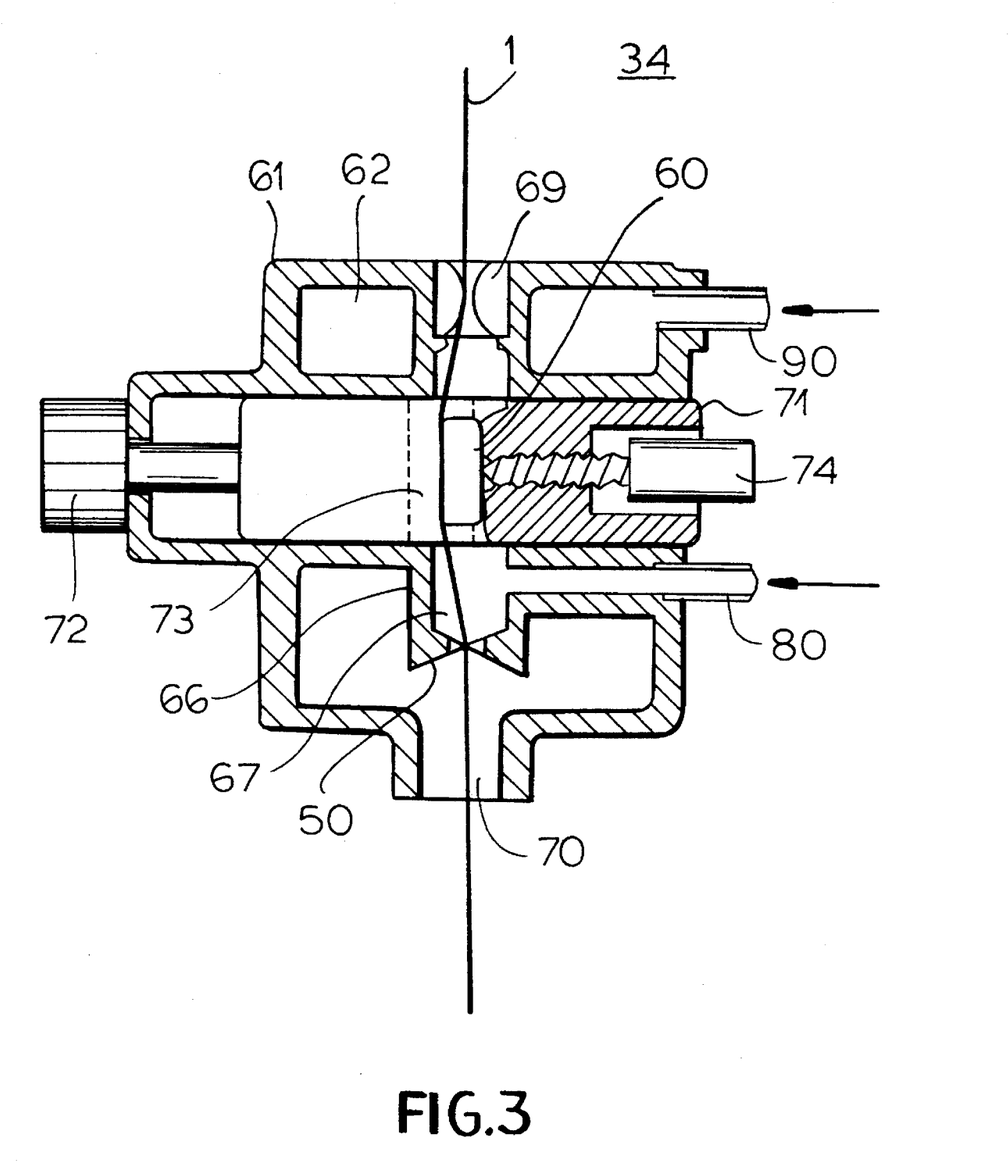
FIG. 3 is a sectional view of another embodiment of the upper guide assembly.

Another embodiment of the upper guide assembly is explained herewith by referring to FIG. 3. Upper guide assembly 3A includes nozzle housing 61. This housing 61 forms not only chamber 62 but also includes nozzle 70 opposite workpiece 2. During the machining process, fluid is introduced from feed inlet 90 into chamber 62 and injected toward the work gap from nozzle 70.

Guide assembly 3A, additionally includes guide housing 66 which is furnished on the inside of the nozzle housing 61. This guide housing 66 forms chamber 67 and also houses movable part 71. This movable part 71 can be moved by actuator 72 in a direction perpendicular to the axis of the travelling wire. This movable part 71 has a hole 73 made in it to allow wire 1 to be threaded through it. Flat-shaped electricity feeding element 60 is attached to this movable part 71 by means of a set screw 74 so that it can either contact or move away from wire 1.

Since this electricity feeding element 60, by loosening set screw 74, changes its location of contact with wire 1, it is perpendicular to the axis of travelling wire 1 and can slide perpendicularly to the direction of travel of movable part 71.

In addition, wire guide 50, which is near nozzle 70 and determines the position of wire 1 opposite workpiece 2, is formed in guide housing 66. From this wire guide 50 and from die guide 69 attached to guide housing 66, fluid not containing any powder is introduced from feed inlet 80 so that fluid containing powder does not enter chamber 67. This serves to make movable part 71 move smoothly and electricity feeding element 60 to slide smoothly. Also, since fluid containing powder does not remain in such a confined part as wire guide 50, there is no need to do any cleaning after machining. As stated before, the pressure of the fluid that is introduced from feed inlet 80 should, desirably, be controlled to the same level as or slightly higher than the pressure of the fluid introduced from feed inlet 90.

The present invention can also be applied to the case of movable parts being used in the wire take-up mechanism, located in the work tank, which carries the used wire to its prescribed place of discharge.

Figure 4:
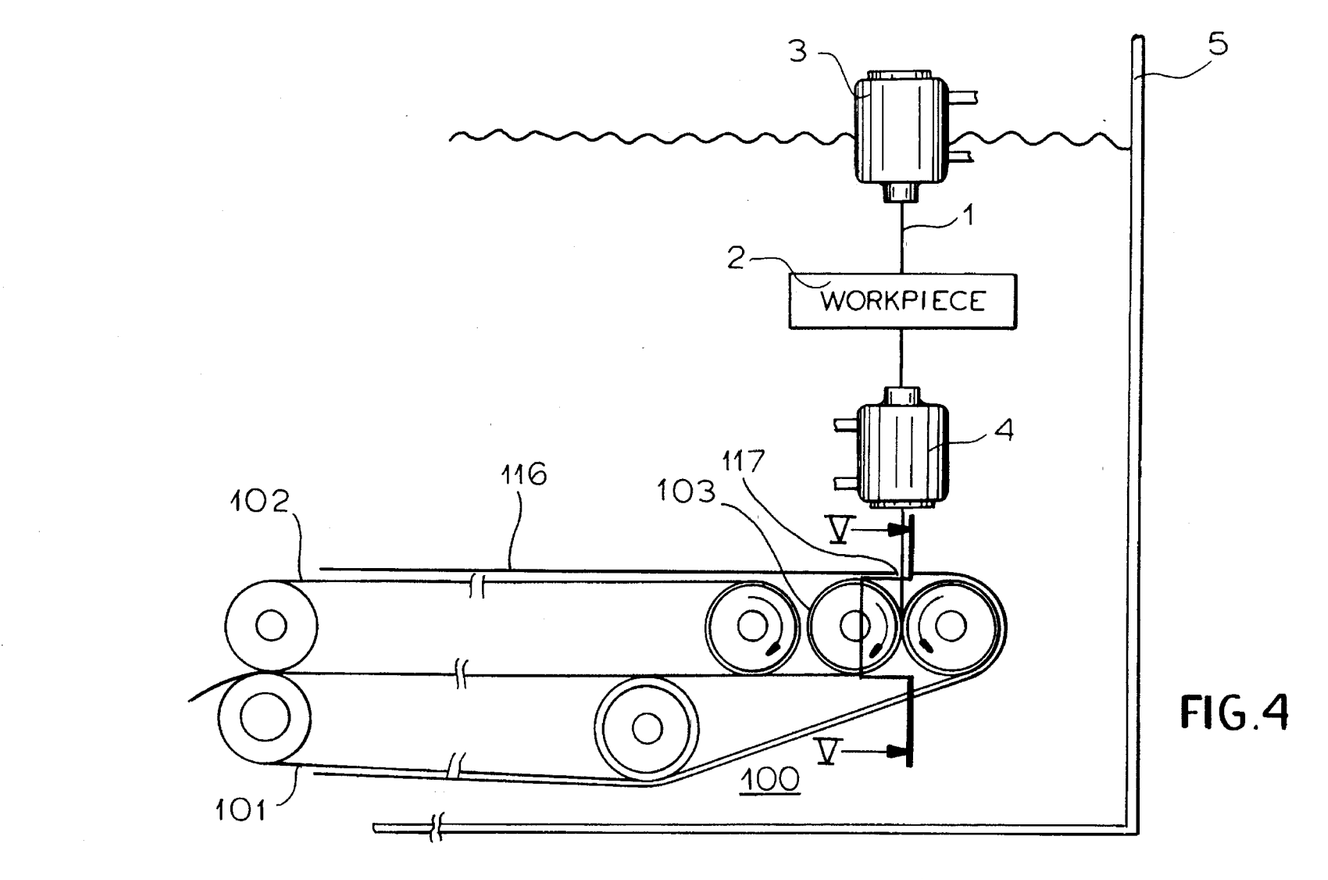
FIG. 4 is a schematic drawing illustrating the wire take-up device.
Figure 5:
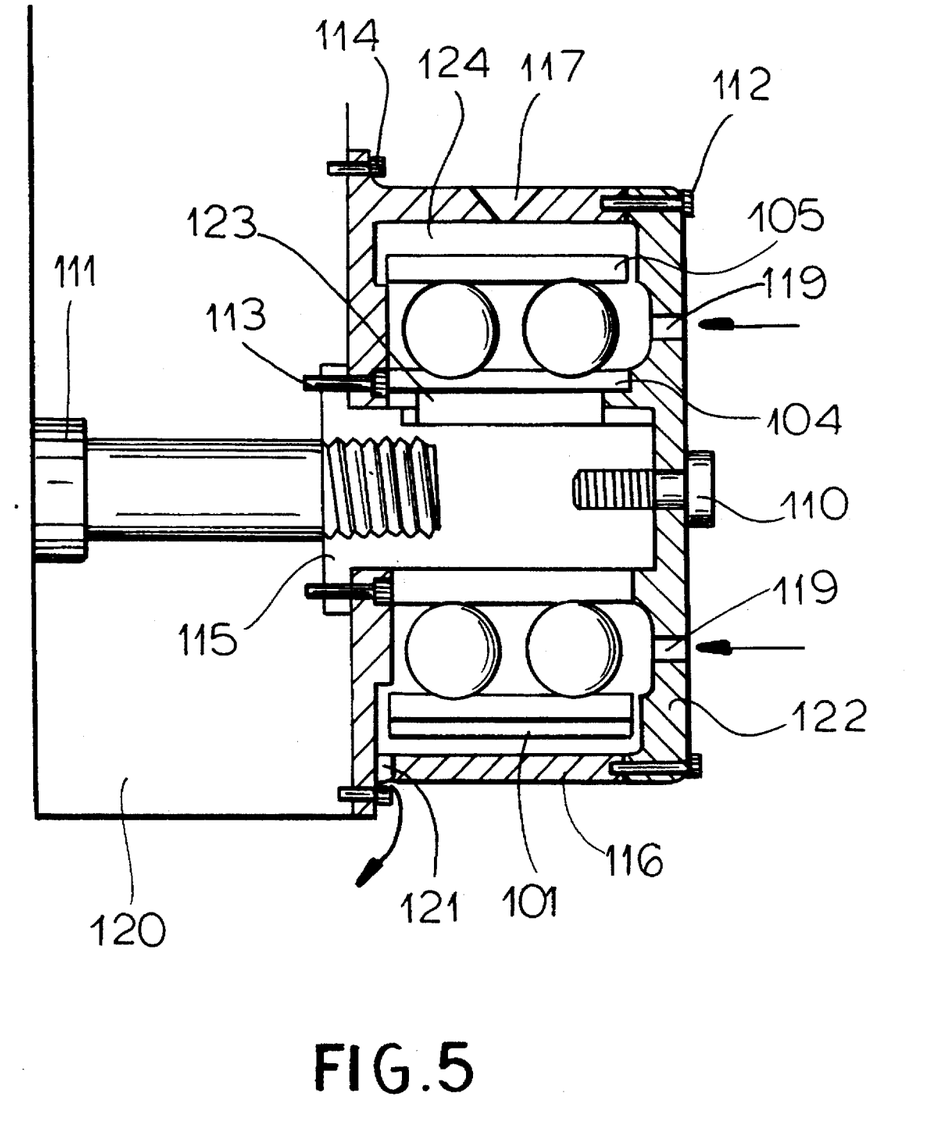
FIG. 5 is a sectional view of the wire take-up device shown in FIG. 4 taken along the line V—V of FIG. 4.

Wire take-up device 100, which is supported by lower arm 120 and which carries, to the prescribed place of discharge, used wire 1 which is sent out from lower guide assembly 4, is explained herewith by referring to FIG. 4 and 5.

Wire take-up device 100 contains belts 101 and 102 which convey the wire and a number of rollers 103 which make those belts move. These rollers 103 are attached to arm 120 which supports lower guide assembly 4. In addition, case 116, which encloses those belts and rollers 103, is fixed to arm 120 by means of bolts 113 and 114.

As best depicted in FIG. 5, roller 103 contains roller shaft 115, inner ring 104 and outer ring 195. Roller shaft 105 is fixed to arm 120 by means of bolt 111. Inner ring 104 is furnished on the outside of roller shaft 115 via key 123. Outer ring 105 is furnished on the outside of 104 via a number of rolling elements.

In addition, cover 122 is attached to roller shaft 115 by means of bolt 110 and also to case 116 by means of bolt 112. Cover 122 is provided with feed inlet 119. The fluid that, as stated before, is fed from tank 40 via solenoid valve 36, backwashing filter 37 and solenoid valves 38 and 41, is made to flow from feed inlet 119 into void 124 formed by the case and cover 122. A very small amount of the fluid flowing into void 124 flows out of flow outlet 121 and guide hole 117 formed in cover 116, and is regulated so that powder-containing fluid does not ingress into void 124. Therefore, in particular, powder does not adhere to the rolling elements used in the rollers.

Figure 6:
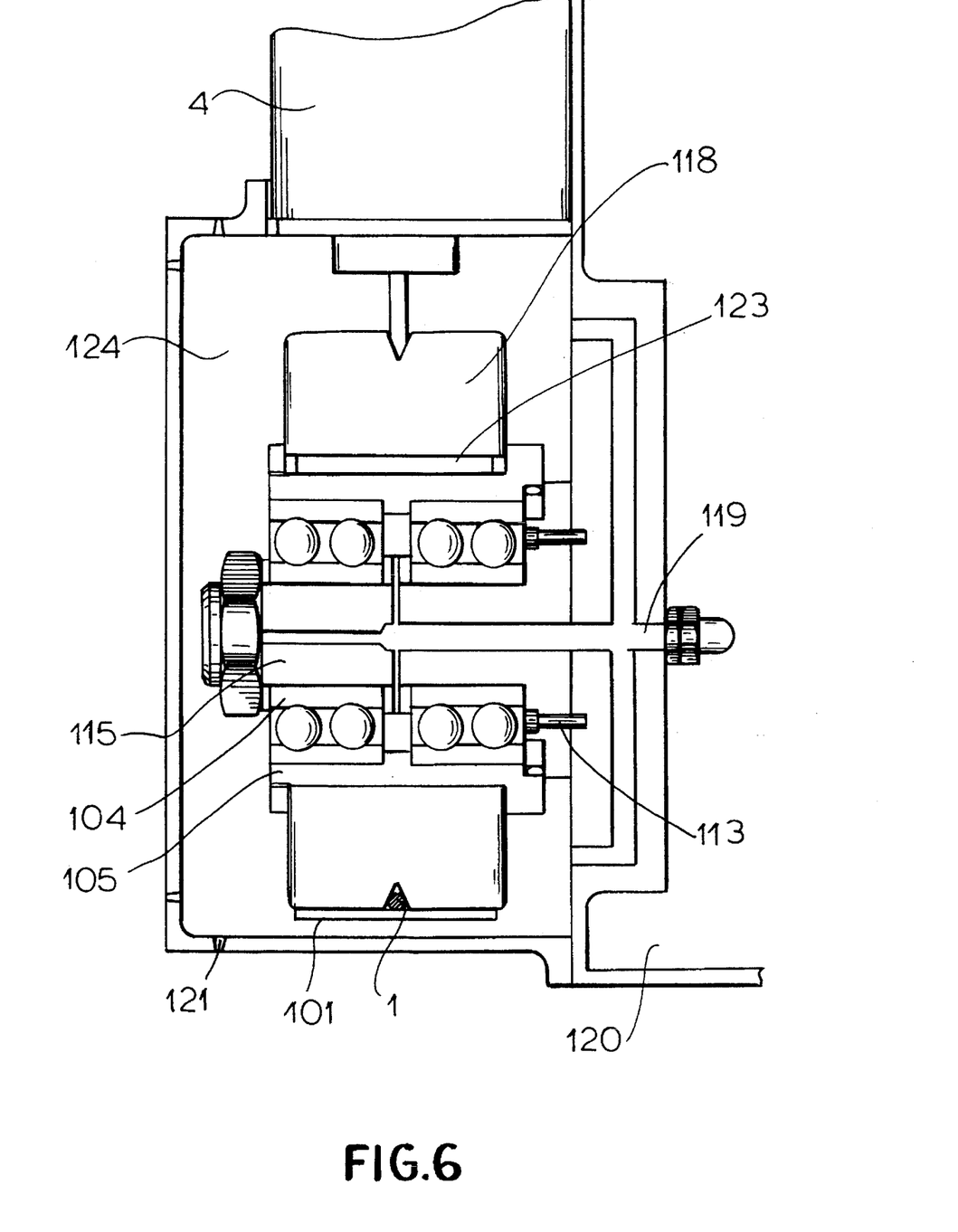
FIG. 6 is a sectional view of another embodiment of the wire take-up device.

FIG. 6 is a section view of another embodiment of the wire take-up device. The parts that are the same as the parts in FIG. 5 bear the same numbers and so their explanations will not be repeated.

In the embodiment illustrated, pulley 118 is furnished on the outside of outer ring 105 via key 123. This pulley 118 has a V groove to guide wire 1. Cover 125 enclosing the rollers 103 is attached to arm 120 and, at the same time, to lower guide assembly 4. The fluid that is fed via valve 41 passes through an appropriate feed pipe inside arm 120 and is introduced via feed inlet 119 to void 124 formed by cover 125.

Figure 7:
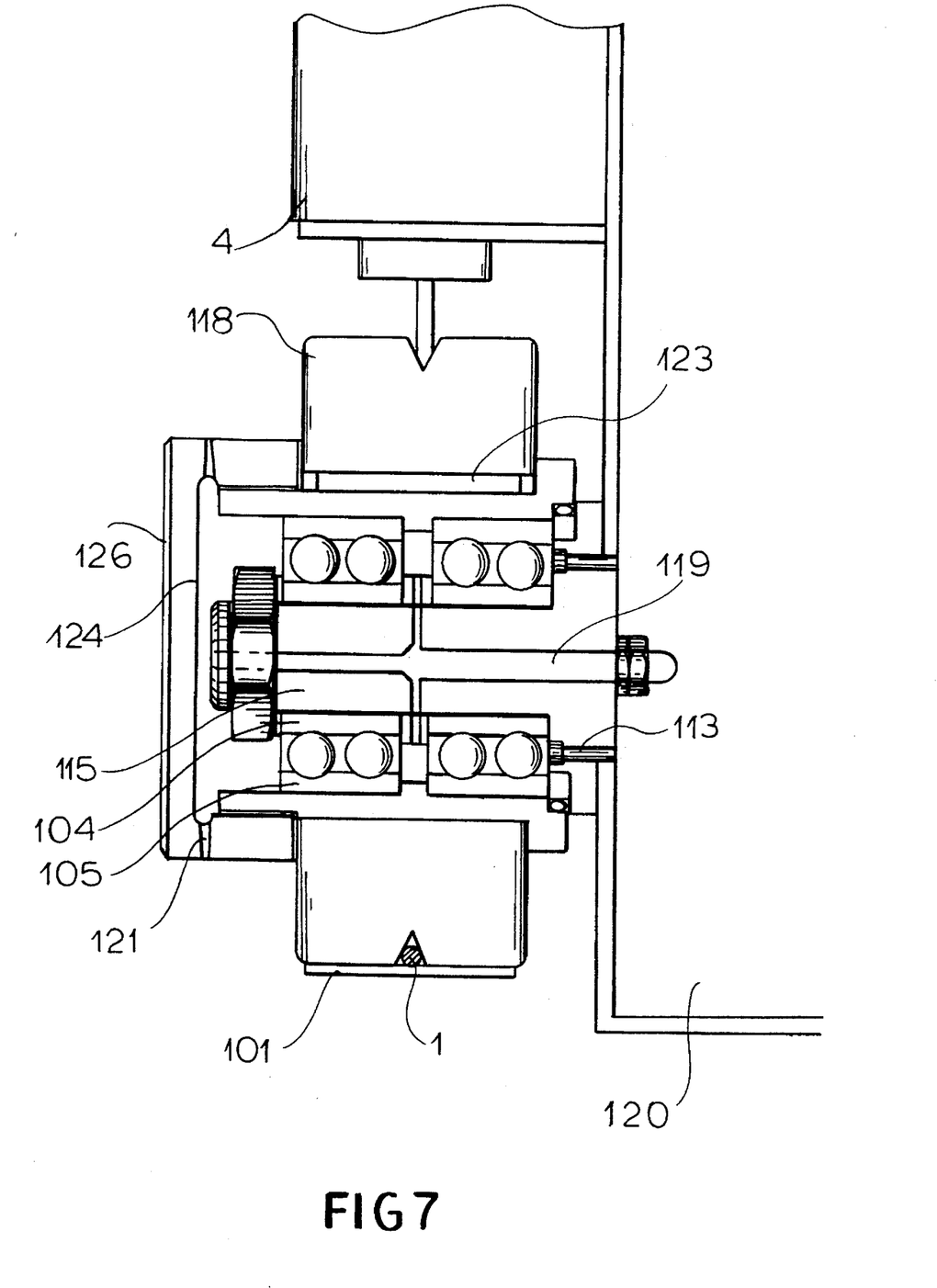
FIG. 7 is a sectional view of yet another embodiment of the wire take-up device.

FIG. 7 is a section view of yet another embodiment of the wire take-up device.

In the embodiment illustrated, cover 126 is attached to arm 120 and encloses rollers 103 individually.

The present invention is not for the purpose of limiting its form to one that is exactly identical to the disclosed form because it is clear from the above explanations that there are many possible improvements and variations. The above embodiments were selected to explain the essence and the practical application of the invention. The scope of the invention is defined by the scope in the attached application for patent.

I claim:

1. An EDM machine comprising:

a work tank;

a tool electrode mounted in said work tank;

means for mounting a workpiece to be machined in said work tank for juxtaposition with said tool electrode, said workpiece to be machined and said electrode forming a gap therebetween in said work tank;

means for storing a first fluid containing a powdery substance;

means for storing a second fluid free from said powdery substance, cover means bounding a space containing parts to be protected from said first fluid; and fluid feeding means for selectively delivering said first fluid to said gap and said second fluid to said space whereby said sectional fluid excludes said first fluid from said parts and an electric discharge across said gap machine said workpiece with said tool electrode.

2. The EDM machine defined in claim 5 wherein said parts include an electricity feeding element enclosed in said cover means and operatively connected with said tool electrode, said tool electrode being a travelling wire forming said gap with said workpiece to be machined.

3. The EDM machine defined in claim 2 wherein said cover means comprises a housing, and displaceable guide means in said housing defining a feed path of said travelling wire for determining position of said tool electrode with respect to said workpiece.

* * * * *